DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 21, 1971

890 O.G. 980

T890,004
COALESCENCE OF COATINGS ON THERMOSENSITIVE SUBSTRATES
Larry Eugene Seever, Richmond, Va., assignor to E. I. du Pont de Nemours and Company, Wilmington, Del.
Filed May 20, 1970, Ser. No. 38,927
Int. Cl. B44d *1/48*
U.S. Cl. 117—119.6
1 Sheet Drawing. 10 Pages Specification

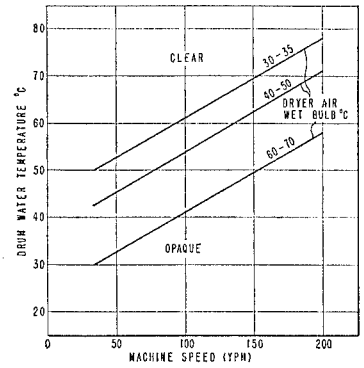

In a continuous process for coating a thermosensitive thermoplastic substrate such as film prepared from polyesters, polyolefins, vinyl acetate polymers and vinylidene chloride polymers with a coalescible coating material such as a 10–65 weight percent dispersion of vinylidene chloride and vinylidene chloride copolymerized with methyl acrylate, acrylic acid, methyl methacrylate, acrylonitrile and methacrylic acid in which an aqueous dispersion of the coating material is applied to the substrate and dried by the evaporation of the aqueous vehicle with heated air, the improvement which comprises:

(a) Determining the wet bulb temperature of heated drying air and the coalescence temperature of the coating material and (b) Increasing the wet bulb temperature of the heated air to at least the coalescence temperature of the coating material. Preferably, the wet bulb temperature of the heated air is increased by an increment sufficient to raise the temperature of the coating to at least the minimum coalescence temperature of coating material during the drying cycle and more preferably, this increase is at least about 20 centigrade degrees above the coalescence temperature of the coating material.

The improved drying process of this invention can be incorporated into conventional drying apparatus such as drum dryers, arch dryers, or floater dryers in which the film is unsupported during drying, and the wet bulb temperature is conveniently increased by the addition of steam to the drying air.

Sept. 21, 1971 L. E. SEEVER T890,004
COALESCENCE OF COATINGS ON THERMOSENSITIVE SUBSTRATES
Filed May 20, 1970
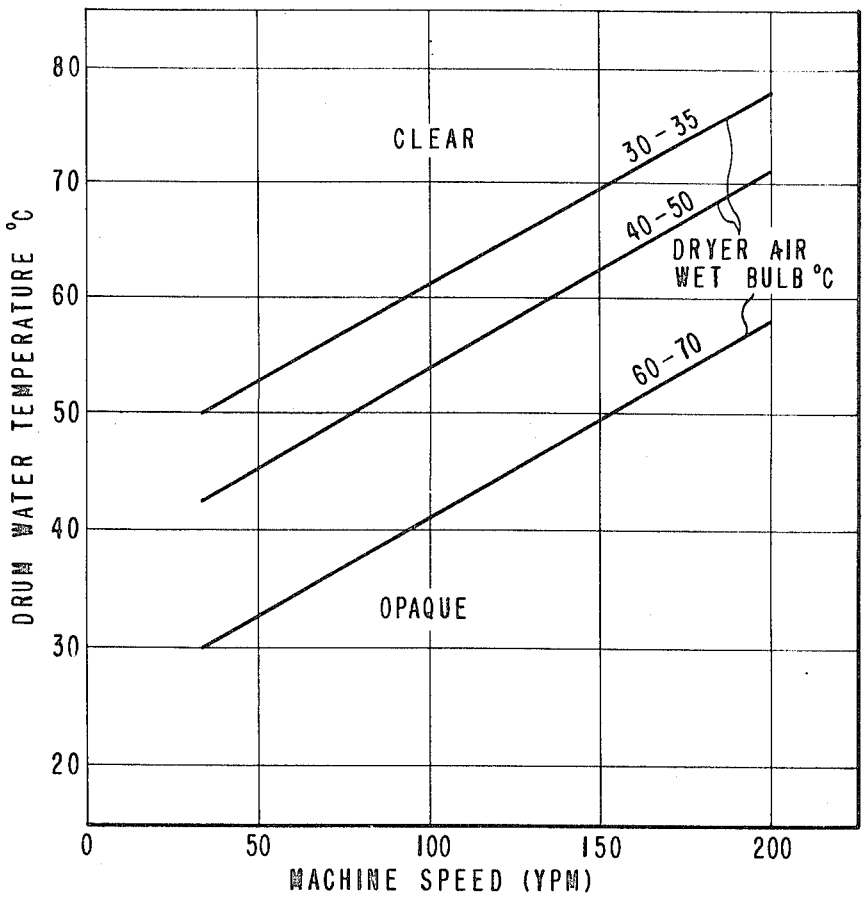
INVENTOR
LARRY E. SEEVER
BY Donald W. Hunter
ATTORNEY